United States Patent

Honda et al.

[11] Patent Number: 5,436,284
[45] Date of Patent: Jul. 25, 1995

[54] COATING COMPOSITION

[75] Inventors: Yoshihiro Honda; Shigeru Masuoka; Masayasu Itoh, all of Hyogo; Masashige Taniguchi, Ibaraki; Shigeo Fukuda, Hyogo, all of Japan

[73] Assignee: NOF Corporation, Tokyo, Japan

[21] Appl. No.: 313,898

[22] Filed: Sep. 28, 1994

[30] Foreign Application Priority Data

Sep. 30, 1993 [JP] Japan ................ 5-269695

[51] Int. Cl.⁶ .................................. C08L 43/04
[52] U.S. Cl. .................................. 523/122; 528/29; 528/32; 526/279; 524/588; 524/558; 524/547; 106/15.05; 106/287.14
[58] Field of Search .............. 528/29, 32; 526/279; 524/558, 547, 588; 106/15.05, 287.14; 523/122

[56] References Cited

U.S. PATENT DOCUMENTS

| | | | |
|---|---|---|---|
| 4,026,826 | 5/1977 | Yoshida et al. | 526/279 |
| 4,883,852 | 11/1989 | Masuoka et al. | 526/279 |
| 4,898,895 | 2/1990 | Masuoka et al. | 523/122 |
| 4,957,989 | 9/1990 | Saitoh | 526/279 |

FOREIGN PATENT DOCUMENTS

| | | |
|---|---|---|
| 0297505 | 1/1989 | European Pat. Off. |
| 2255343 | 11/1992 | United Kingdom |
| WO8402915 | 8/1984 | WIPO |

*Primary Examiner*—Melvyn I. Marquis
*Assistant Examiner*—M. Glass
*Attorney, Agent, or Firm*—Sughrue, Mion, Zinn, Macpeak & Seas

[57] ABSTRACT

A coating composition contains as essential components one or more antifoulants and copolymer obtained from monomers mixture comprising monomer A represented by formula (1):

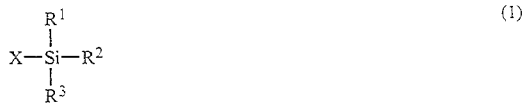

wherein $R^1$ to $R^3$ each is a group selected from alkyl groups and aryl groups and may be the same or different, and X is an acryloyloxy group, a methacryloyloxy group, a maleinoyloxy group, or a fumaroyloxy group and monomer B represented by formula (2):

$$Y-(CH_2CH_2O)_n-R^4 \qquad (2)$$

wherein $R^4$ is an alkyl group or an aryl group, Y is an acryloyloxy group, a methacryloyloxy group, a maleinoyloxy group, or a fumaroyloxy group, and n is an integer of 1 to 25.

5 Claims, No Drawings

COATING COMPOSITION

FIELD OF THE INVENTION

The present invention relates to a coating composition for use in preventing the attachment of organisms to the surfaces of structures submerged in seawater.

BACKGROUND OF THE INVENTION

Antifouling paints employing an organotin copolymer and forming a coating film which gradually dissolves away in seawater are excellent in the ability to prevent the attachment of marine organisms to the surfaces of ship bottoms, etc., but the use thereof is restricted in recent years because of the problem of sea pollution.

As a coating composition for eliminating the sea pollution problem is widely used an antifouling paint employing rosin as a soluble resin. Antifouling paints employing polymers containing various hydrolyzable groups incorporated therein have also been proposed. However, these antifouling paints all have not been put to wide practical use. Among those antifouling paints is, for example, an antifouling paint of the hydrolyzable self-polishing type proposed in WO 84/02915 and JP-A-63-215780 which employs a (meth)acrylic ester polymer having triorganosilyl groups in side chains or a similar polymer. (The term "JP-A" as used herein means an "unexamined published Japanese patent application.")

The present inventors made intensive studies on coating films of such an organosilicon containing polymer. As a result, it was found that the antifouling paint employing a polymer modified by only incorporating triorganosilyl groups in side chains of the molecule as described in the above-cited reference has problems such as the following: (1) the coating film does not show erosion in the rotary test which is the most important test for evaluating hydrolyzable antifouling paints (a test for measuring coating film thickness reduction as erosion rate! in which test pieces are fixed to the outer circumferential surface of a cylindrical drum and the drum is rotated in seawater at a peripheral speed of 16 knots); (2) the coating film does not exhibit satisfactory antifouling properties in exposure test .(immersion test); and (3) the coating film develops cracking and shows poor adherence to the substrate or primer coat, so that it peels off when immersed in seawater. Thus, the antifouling paints of the above-described kind do not have properties required for antifouling paints.

SUMMARY OF THE INVENTION

Accordingly, an object of the present invention is to provide a coating composition giving a coating film which undergoes neither cracking nor peeling and shows moderate hydrolyzability to dissolve into seawater constantly at an adequate rate and which therefore exhibits excellent antifouling property for long term.

As a result of intensive studies made by the present inventors in order to attain the above object, a specific copolymer has been invented. A specific copolymer in which alkoxy- or aryloxypolyethylene glycol groups as well as triorganosilyl groups have been incorporated into side chains of a molecule is used along with antifoulants to prepare a coating composition, this composition gives coating film which undergoes neither cracking nor peeling and shows moderate hydrolyzability to dissolve into seawater constantly at adequate rate and which exhibits excellent antifouling property for long term. The present invention has been completed based on the above astonishing finding.

The present invention is concerned with a coating composition containing as essential components antifoulants and copolymer obtained from monomers mixture comprising a monomer A represented by formula (1):

wherein $R^1$ to $R^3$ each is a group selected from alkyl groups and aryl groups and may be the same or different, and X is an acryloyloxy group, a methacryloyloxy group, a maleinoyloxy group, or a fumaroyloxy group and monomer B represented by formula (2):

wherein $R^4$ is an alkyl group or an aryl group, Y is an acryloyloxy group, methacryloyloxy group, a maleinoyloxy group, or a fumaroyloxy group, and n is an integer of 1 to 25.

DETAILED DESCRIPTION OF THE INVENTION

The coating composition of the present invention contains as one of its essential components copolymer obtained from monomers mixture which comprises at least one monomer A represented by the above-described formula (1) and at least one monomer B represented by the above-described formula (2) and which may optionally contain at least one monomer copolymerizable therewith (the copolymer is hereinafter referred to as "copolymer AB").

As shown in formula (1), monomer A has in its molecule an acryloyloxy group, a methacryloyloxy group, a maleinoyloxy group (mostly in the form of monoalkyl ester with 1–6 carbon atoms), or a fumaroyloxy group (mostly in the form of monoalkyl ester with 1–6 carbon atoms) as an unsaturated group (X) and also has a triorganosilyl group.

In the triorganosilyl group, the three alkyl or aryl groups ($R^1$ to $R^3$) may be the same or different. Specific examples of these groups include a linear or branched alkyl group having up to 20 carbon atoms (e.g., methyl, ethyl, propyl, and butyl); a cycloalkyl group (e.g., cyclohexyl and substituted cyclohexyl); and an aryl group (e.g., phenyl and naphthyl) and a substituted aryl group (e.g., substituted phenyl and substituted naphthyl). Examples of the substituted aryl groups include aryl groups substituted with a halogen atom, an alkyl group with up to about 18 carbon atoms, an acyl group, a nitro group, or an amino group.

Examples of monomer A which has a (meth)acryloyloxy group in a molecule include trimethylsilyl (meth)acrylate, triethylsilyl(meth)acrylate, tri-n-propylsilyl(meth)acrylate, triisopropylsilyl (meth)acrylate, tri-n-butylsilyl (meth)acrylate, triisobutylsilyl (meth)acrylate, tri-s-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, and tribenzylsilyl (meth)acrylate.

Other examples of monomer A having a (meth)acryloyloxy group in a molecule include ethyldimethylsilyl (meth)acrylate, n-butyldimethylsilyl (meth)acrylate, diisopropyl-n-butylsilyl (meth)acrylate, n-octyldi-n-butylsilyl (meth)acrylate, diisopropylstearylsilyl (meth)acrylate, dicyclohexylphenylsilyl (meth)acrylate, t-butyldiphenylsilyl (meth)acrylate, and lauryldiphenylsilyl (meth)acrylate.

Examples of monomer A which has a maleinoyloxy or fumaroyloxy group in a molecule include triisopropylsilyl methyl maleate, triisopropylsilyl amyl maleate, tri-n-butylsilyl n-butyl maleate, t-butyldiphenylsilyl methyl maleate, t-butyldiphenylsilyl n-butyl maleate, triisopropylsilyl methyl fumarate, triisopropylsilyl amyl fumarate, tri-n-butylsilyl n-butyl fumarate, t-butyldiphenylsilyl methyl fumarate, and t-butyldiphenylsilyl n-butyl fumarate.

As shown in formula (2), monomer B has in its molecule an acryloyloxy group, a methacryloyloxy group, a maleinoyloxy group (mostly in the form of monoalkyl ester with 1-6 carbon atoms), or a fumaroyloxy group (mostly in the form of monoalkyl ester with 1-6 carbon atoms) group as an unsaturated group (Y) and also has an alkoxy- or aryloxypolyethylene glycol group.

In the alkoxy- or aryloxypolyethylene glycol group, the degree of polymerization (n) of the polyethylene glycol is from 1 to 25. Examples of the alkyl or aryl group ($R^4$) include a linear or branched alkyl group having up to 12 carbon atoms (e.g., methyl, ethyl, propyl, and butyl); a cycloalkyl group (e.g., cyclohexyl and substituted cyclohexyl); and an aryl group (e.g., phenyl and naphthyl) and a substituted aryl group (e.g., substituted phenyl and substituted naphthyl). Examples of the substituted aryl groups include aryl groups substituted with a halogen atom, an alkyl group with up to about 18 carbon atoms, an acyl group, a nitro group, or an amino group.

Examples of monomer B which has a (meth)acryloyloxy group in a molecule include methoxyethyl (meth)acrylate, ethoxyethyl (meth)acrylate, propoxyethyl (meth)acrylate, butoxyethyl (meth)acrylate, hexoxyethyl (meth)acrylate, methoxydiethylene glycol (meth)acrylate, methoxytriethylene glycol (meth)acrylate, ethoxydiethylene glycol (meth)acrylate, and ethoxytriethylene glycol (meth)acrylate.

Examples of monomer B which has a maleinoyloxy or fumaroyloxy group in a molecule include methoxyethyl n-butyl maleate, ethoxydiethylene glycol methyl maleate, ethoxytriethylene glycol methyl maleate, propoxydiethylene glycol methyl maleate, butoxyethyl methyl maleate, hexoxyethyl methyl maleate, methoxyethyl n-butyl fumarate, ethoxydiethylene glycol methyl fumarate, ethoxytriethylene glycol methyl fumarate, propoxydiethylene glycol methyl fumarate, butoxyethyl methyl fumarate, and hexoxyethyl methyl fumarate.

As other monomers copolymerizable with these monomers A and B, use may be made of various vinyl monomers such as acrylic esters, methacrylic esters, styrene, vinyl esters (e.g., vinyl acetate, vinyl propionate, vinyl butyrate, vinyl benzoate), vinyltoluene, -methylstyrene, crotonic esters, and itaconic esters.

In the monomers mixture, the proportions of monomers A and B and other monomer(s) copolymerizable therewith may be suitably determined depending on the use of the coating composition. In general, however, it is preferred that the proportion of monomer A is from 1 to 95% by weight, that of monomer B is from 1 to 95% by weight, and that of other monomer(s) copolymerizable therewith is from 0 to 95% by weight on the basis of the total weight of the monomers.

Copolymer AB can be obtained by polymerizing such monomers mixture in the presence of a vinyl polymerization initiator by any of various methods such as solution polymerization, bulk polymerization, emulsion polymerization, and suspension polymerization in an ordinary way. In preparing a coating composition from copolymer AB, it is advantageous to dilute the copolymer with an organic solvent to give a polymer solution having an adequate viscosity. For this, it is desirable to employ the solution polymerization method or bulk polymerization method.

Examples of the vinyl polymerization initiator include azo compounds such as azobisisobutyronitrile and triphenylmethylazobenzene; and peroxides such as benzoyl peroxide, di-t-butyl peroxide, t-butyl peroxybenzoate, and t-butyl peroxyisopropylcarbonate.

Examples of the organic solvent include aromatic hydrocarbons such as xylene and toluene; aliphatic hydrocarbons such as hexane and heptane; esters such as ethyl acetate and butyl acetate; alcohols such as isopropyl alcohol and butyl alcohol; ethers such as dioxane and diethyl ether; and ketones such as methyl ethyl ketone and methyl isobutyl ketone. The solvents are used either alone or in combination.

The molecular weight of copolymer AB thus obtained is desirably in the range of from 1,000 to 150,000 in terms of weight-average molecular weight. Too low molecular weights result in difficulties in forming normal coating film, while too high molecular weights result in disadvantages that a single coating operation only gives thin coating film and, hence, coating operations should be conducted in a larger number. It is advantageous that the viscosity of the solution of copolymer AB is 150 P or lower at 25° C. For attaining this, it is preferred to regulate the solid content of the polymer solution to a value in the range of from 5 to 90% by weight, desirably from 15 to 85% by weight.

The antifoulant used as another essential component in the coating composition of the present invention may be any of a wide range of conventionally known antifoulants. The known antifoulants are roughly divided into inorganic compounds, metal-containing organic compounds, and metal-free organic compounds.

Examples of the inorganic compounds include copper compounds such as cuprous oxide, copper powder, copper thiocyanate, copper carbonate, copper chloride, and copper sulfate, zinc sulfate, zinc oxide, nickel sulfate, and copper-nickel alloys.

Examples of the metal-containing organic compounds include organocopper compounds, organonickel compounds, and organozinc compounds. Also usable are maneb, manzeb, propineb, and the like. Exemples of the organocopper compounds include oxine copper, copper nonylphenolsulfonate, copper bis ( ethylenediamine ) bis ( dodecylbenzenesulfonate ), copper acetate, copper naphthenate, and copper bis (pentachlorophenolate). Examples of the organonickel compounds include nickel acetate and nickel dimethyldithiocarbamate. Examples of the organozinc compounds include zinc acetate, zinc carbamate, zinc dimethyldithiocarbamate, zinc pyrithione, and zinc ethylenebis ( dithiocarbamate ).

Examples of the metal-free organic compounds include N-trihalomethylthiophthalimides, dithiocarbamic acids, N-arylmaleimides, 3-(substituted amino)-1,3- thiazolidine-2,4-diones, dithiocyano compounds, triazine compounds, and others.

Examples of the N-trihalomethylthiophthalimides include N-trichloromethylthiophthalimide and N-fluorodichloromethylthiophthalimide. Examples of the dithiocarbamic acids include bis(dimethylthiocarbamoyl) disulfide, ammonium N-methyldithiocarbamate, ammonium ethylenebis(dithiocarbamate), and milneb.

Examples of the N-arylmaleimides include N-(2,4,6-trichlorophenyl)maleimide, N-4-tolylmaleimide, N-3-chlorophenylmaleimide, N-(4-n-butylphenyl)maleimide, N-(anilinophenyl)maleimide, and N-(2,3-xylyl)maleimide.

Examples of the 3-(substituted amino)-1,3-thiazolidine-2,4-diones include 3-benzylideneamino-1,3-thiazolidine-2,4-dione, 3-(4-methylbenzylideneamino)1,3-thiazolidine-2,4-dione, 3-(2-hydroxybenzylideneamino)-1,3-thiazolidine-2,4-thiazolidine-2,4-dione, 3-(4-dichlorobenzylideneamino)- 1,3-thiazolidine-2,4-dione, and 3-(2,4-dichlorobenzylideneamino)-1,3-thiazolidine-2,4-dione.

Examples of the dithiocyano compounds include dithiocyanomethane, dithiocyanoethane, and 2,5-dithiocyanothiophene. Examples of the triazine compounds include 2-methylthio-4-t-butylamino-6-cyclopropylamino-s-triazine.

Other examples of the metal-free organic compounds include 2,4,5,6-tetrachloroisophthalonitrile, N,N-dimethyldichlorophenylurea, 4,5-dichloro-2-n-octyl-4-isothiazoline-3-one, N,N-dimethyl-N'-phenyl-(N-fluorodichloromethylthio)sulfamide, tetramethylthiuram disulfide, 3-iodo-2-propylbutyl carbamate, 2-(methoxycarbonylamino)benzimidazole, 2,3,5,6-tetrachloro-4-(methylsulfonyl)pyridine, diiodomethyl-p-tolyl sulfone, bis(dimethylcarbamoyl)zinc ethylene bis(dithiocarbamate), phenyl(bispyridine)bismuth dichloride, 2-(4-thiazolyl)benzimidazole, and pyridine triphenylborane.

One or more antifoulants selected from such antifoulants are employed in the present invention. The antifoulants are used in such an amount that the proportion thereof in the solid contents of the coating composition is usually from 0.1 to 80% by weight, preferably from 1 to 60% by weight. Told small antifoulant amounts do not produce an antifouling effect, while too large antifoulant amounts result in the formation of a coating film which is apt to develop defects such as cracking and peeling and thus becomes less effective in antifouling property.

Additive ingredients may optionally be incorporated into the coating composition of the present invention thus prepared. Examples of the additive ingredients are colorants such as pigments (e.g., red iron oxide, zinc oxide, titanium dioxide, talc), and dyes, dehumidifiers, and additives ordinarily employed in coating compositions as antisagging agents, antiflooding agents, antisettling agents, and antifoaming agents.

For formulating antifouling coating film from the coating composition of the present invention on the surface of a structure to be submerged in seawater, use may be made of a method in which the coating composition is applied on the surface in a suitable manner and the solvent is removed by evaporation at ordinary temperature or with heating. By this method, a dry coating film can be easily formed on the surface of the structure.

The coating composition of the present invention is applicable to objects required to be protected against the fouling or damage caused by marine organisms, such as ship bottoms, fishing nets, and underwater structures including cooling water pipes, and is also usable for the prevention of sludge diffusion in marine construction works. In such applications, the coating film undergoes neither cracking nor peeling, shows moderate hydrolyzability to dissolve into the seawater constantly at adequate rate, and is hence capable of affording long-lasting excellent protection against the fouling or damage caused by marine organism attachment.

The present invention will be explained below in more detail by reference to preparation examples, examples (of the present invention), and comparative examples. In these examples, unless otherwise indicated, all parts are by weight and the molecular weights are given in terms of weight-average molecular weight measured by GPC and calculated for standard polystyrene. Monomers A ($A_1$ to $A_7$) used in the preparation examples are those represented by the above-described formula (1), with the $R^1$ to $R^3$ and X in the formula being specified in Table 1 given below. Further, monomers B ($B_1$ to $B_7$) used in the preparation examples are those represented by the above-described formula (2), with the Y, n, and $R^4$ in the formula being specified in Table 2 given below.

TABLE 1

| | Organic Groups in General Formula (1) | | | |
|---|---|---|---|---|
| | $R^1$ | $R^2$ | $R^3$ | X |
| Monomer $A_1$ | $CH_3$ | $CH_3$ | $t-C_4H_9$ | $CH_2{=}CHCOO$ |
| Monomer $A_2$ | $i-C_3H_7$ | $i-C_3H_7$ | $i-C_3H_7$ | $CH_2{=}CHCOO$ |
| Monomer $A_3$ | $n-C_4H_9$ | $n-C_4H_9$ | $n-C_4H_9$ | $CH_2{=}C(CH_3)COO$ |
| Monomer $A_4$ | $C_6H_5$ | $C_6H_5$ | $t-C_4H_9$ | $CH_2{=}C(CH_3)COO$ |
| Monomer $A_5$ | $n-C_3H_7$ | $i-C_3H_7$ | $i-C_3H_7$ | $CH_2{=}C(CH_3)COO$ |
| Monomer $A_6$ | $C_6H_5$ | $C_6H_5$ | $t-C_4H_9$ | $C_5H_{11}OOCCH{=}CHCOO$ (maleinoyloxy group) |
| Monomer $A_7$ | $n-C_4H_9$ | $n-C_4H_9$ | $n-C_4H_9$ | $C_5H_{11}OOCCH{=}CHCOO$ (fumaroyloxy group) |

TABLE 2

| | Organic Groups in General Formula (2) | | |
|---|---|---|---|
| | Y | n | $R^4$ |
| Monomer $B_1$ | $CH_2{=}CHCOO$ | 1 | $CH_3$ |
| Monomer $B_2$ | $CH_2{=}C(CH_3)COO$ | 1 | $CH_3$ |
| Monomer $B_3$ | $CH_2{=}CHCOO$ | 2 | $C_2H_5$ |
| Monomer $B_4$ | $CH_2{=}C(CH_3)COO$ | 9 | $C_6H_5$ |
| Monomer $B_5$ | $CH_2{=}C(CH_3)COO$ | 23 | $C_4H_9$ |
| Monomer $B_6$ | $C_4H_9OOCCH{=}CHCOO$ (maleinoyloxy group) | 1 | $CH_3$ |
| Monomer $B_7$ | $CH_3OOCCH{=}CHCOO$ | 2 | $C_2H_5$ |

TABLE 2-continued

| Organic Groups in General Formula (2) | | |
| --- | --- | --- |
| Y | n | $R^4$ |
| (fumaroyloxy group) | 5 | |

PREPARATION EXAMPLES 1 TO 5

According to the formulations shown in Table 3 given below, solvent was placed in a flask equipped with a stirrer and heated to a predetermined reaction temperature, following which a liquid mixture consisting of monomer A, monomer B, other monomers, and a polymerization catalyst was introduced dropwise into the flask with stirring over a period of 3 hours. After completion of the addition, the contents were held at that temperature for 30 minutes. A mixture of a solvent and a polymerization catalyst b was then added dropwise over a period of 20 minutes, and the resulting mixture was stirred at that temperature for 2 hours to complete the polymerization reaction. Finally, a diluent solvent was added to dilute the reaction mixture. Thus, polymer solutions $S_1$ to $S_5$ were obtained.

In Table 3, "Perbutyl I" (trade name of NOF Corporation, Japan) given as a polymerization catalyst is t-butyl peroxyisopropylcarbonate.

TABLE 3

| | | | Preparation Example | | | | |
| --- | --- | --- | --- | --- | --- | --- | --- |
| | | | 1 | 2 | 3 | 4 | 5 |
| Formulation (parts) | Solvent a | Xylene | 40 | 40 | — | 30 | 40 |
| | | Butyl acetate | — | 10 | 40 | — | — |
| | Monomer A | Monomer $A_1$ | 5 | — | — | — | — |
| | | Monomer $A_2$ | — | 60 | — | — | — |
| | | Monomer $A_3$ | — | — | 55 | — | — |
| | | Monomer $A_4$ | 45 | — | — | 50 | — |
| | | Monomer $A_5$ | — | — | — | — | 30 |
| | | Monomer $A_6$ | — | — | — | — | — |
| | | Monomer $A_7$ | — | — | — | — | — |
| | Monomer B | Monomer $B_1$ | 10 | — | — | — | 40 |
| | | Monomer $B_2$ | — | 15 | — | — | — |
| | | Monomer $B_3$ | — | — | 15 | — | — |
| | | Monomer $B_4$ | — | — | 5 | — | 30 |
| | | Monomer $B_5$ | — | — | — | 10 | — |
| | | Monomer $B_6$ | — | — | — | — | — |
| | | Monomer $B_7$ | — | — | — | — | — |
| Formulation (parts) | Other monomers | Methyl methacrylate | 35 | 20 | 20 | 30 | — |
| | | n-Butyl methacrylate | — | 5 | — | — | — |
| | | n-Butyl acrylate | — | — | 5 | — | — |
| | | Octyl acrylate | — | — | — | 10 | — |
| | | Vinyl acetate | — | — | — | — | — |
| | | Styrene | 5 | — | — | — | — |
| | Polymerization catalyst a | Azobisisobutyronitrile | — | — | — | — | 1 |
| | | Perbutyl I | 2 | 1 | 2 | 5 | — |
| | Solvent b | Xylene | 10 | 10 | 10 | 10 | 10 |
| | Polymerization catalyst b | Azobisisobutyronitrile | — | — | — | — | 1 |
| | | Perbutyl I | 1 | 1 | 1 | 1 | — |
| | Diluent solvent | xylene | 47 | 48 | 16 | 54 | 48 |
| | | Butyl acetate | — | — | 31 | — | — |
| Reaction Temerature (°C.) | | | 140 | 134 | 142 | 118 | 80 |
| Solid Content (%) | | | 50 | 50 | 50 | 50 | 50 |
| Molecular Weight of the Polymer (× 1000) | | | 31 | 28 | 67 | 3 | 40 |
| Polymer Solution | | | $S_1$ | $S_2$ | $S_3$ | $S_4$ | $S_5$ |

PREPARATION EXAMPLE 6

In a heat- and pressure-resistant vessel were placed monomer A, monomer B, other monomers, and polymerization catalyst according to the formulation shown in Table 4 given below. The vessel was completely sealed. The contents were then heated to a predetermined reaction temperature with shaking and the shaking was continued at that temperature for 8 hours to complete the reaction. A diluent solvent was then added to dissolve the reaction product with shaking for 1 hour, thereby giving a polymer solution $S_6$. In Table 4, "Perbutyl I" given as a polymerization catalyst has the same meaning as in Table 3.

PREPARATION EXAMPLE 7

In a flask equipped with a stirrer were placed solvent monomer A, monomer B, other monomers, and polymerization catalyst according to the formulation shown in Table 4 given below. The contents were heated to a predetermined reaction temperature with stirring and subsequently kept being stirred at that temperature for 6 hours to complete the reaction. The reaction mixture was then diluted with a diluent solvent to obtain a polymer solution S7.

TABLE 4

| | | | Preparation Example | |
| --- | --- | --- | --- | --- |
| | | | 6 | 7 |
| Formulation (parts) | Solvent a | Xylene | — | 30 |
| | | Butyl acetate | — | — |
| | Monomer A | Monomer $A_1$ | — | — |
| | | Monomer $A_2$ | — | — |
| | | Monomer $A_3$ | — | — |
| | | Monomer $A_4$ | — | — |
| | | Monomer $A_5$ | — | — |
| | | Monomer $A_6$ | 40 | — |
| | | Monomer $A_7$ | — | 30 |
| | Monomer B | Monomer $B_2$ | — | — |
| | | Monomer $B_3$ | — | — |
| | | Monomer $B_4$ | — | — |
| | | Monomer $B_5$ | — | — |
| | | Monomer $B_6$ | 20 | — |
| | | Monomer $B_7$ | — | 30 |
| Formulation (parts) | Other monomers | Methyl methacrylate | — | — |
| | | n-Butyl methacrylate | — | — |
| | | n-Butyl acrylate | — | — |
| | | Octyl acrylate | — | — |

TABLE 4-continued

|  |  | Preparation Example | |
|---|---|---|---|
|  |  | 6 | 7 |
|  | Vinyl acetate | 30 | 35 |
|  | Styrene | 10 | 5 |
| Polymerization | Azobisisobutyronitrile | — | — |
| catalyst a | Perbutyl I | 2 | 1 |
| Diluent | Xylene | 98 | 69 |
| solvent | Butyl acetate | — | — |
| Reaction Temperature (°C.) |  | 110 | 110 |
| Solid Content (%) |  | 50 | 50 |
| Molecular Weight of the Polymer (× 1000) |  | 24 | 117 |
| Polymer Solution |  | $S_6$ | $S_7$ |

COMPARATIVE PREPARATION EXAMPLE 1

Polymerization was conducted in the same manner as in Preparation Example 1 except that 100 parts of tri-n-butylsilyl methacrylate was used as a monomer. Thus, polymer solution $T_8$ was obtained, which was a 50 wt% xylene solution. The molecular weight of the homopolymer obtained was 32,000.

COMPARATIVE PREPARATION EXAMPLE 2

Polymerization was conducted in the same manner as in Preparation Example 1 except that 50 parts of tri-n-butylsilyl methacrylate and 50 parts of methyl methacrylate were used as a monomer mixture. Thus, polymer solution $T_9$ was obtained, which was a 50 wt% xylene solution. The molecular weight of the copolymer obtained was 30,000.

COMPARATIVE PREPARATION EXAMPLE 3

Polymerization was conducted in the same manner as in Preparation Example 1 except that 50 parts of ethoxyethyl acrylate and 50 parts of methyl methacrylate were used as a monomer mixture. Thus, polymer solution $T_{10}$ was obtained, which was a 50 wt% xylene solution. The molecular weight of the copolymer obtained was 31,000.

EXAMPLES 1 TO 20

Polymer solutions $S_1$ to $S_7$ each was mixed with other ingredients according to each of the formulations shown in Tables 5 to 9 given below (the figures in the tables are given in terms of percent by weight), and each mixture was homogenized with a homomixer at 2,000 rpm. Thus, 20 coating compositions were prepared.

In the formulations, "Disparon A630-20X"(trade name of Kusumoto Chemicals Ltd., Japan) and "Bentone SD-2"(trade name of National Lead K.K., Japan) each is an antisagging agent.

TABLE 5

|  |  | Example | | | |
|---|---|---|---|---|---|
|  |  | 1 | 2 | 3 | 4 |
| Polymer | Polymer solution $S_1$ | 10 | — | — | 50 |
| solution | Polymer solution $S_2$ | 30 | — | 55 | — |
|  | Polymer solution $S_3$ | — | — | — | — |
|  | Polymer solution $S_4$ | — | 24 | — | 10 |
|  | Polymer solution $S_5$ | — | — | — | — |
|  | Polymer solution $S_6$ | — | — | — | — |
|  | Polymer solution $S_7$ | — | — | — | — |
|  | Polymer solution $T_8$ | — | — | — | — |
|  | Polymer solution $T_9$ | — | — | — | — |
|  | Polymer solution $T_{10}$ | — | — | — | — |
| Antifoulant | Cuprous oxide | 40 | 30 | 30 | — |
|  | Copper thiocyanate | — | — | — | 20 |
|  | Copper/nickel solid-solution alloy | — | — | — | — |
|  | 2,4,5,6-Tetrachloroisophthalonitrile | — | 10 | — | — |
|  | N,N-Dimethyldichlorophenylurea | — | — | 5 | 9 |
|  | 4,5-Dichloro-2-n-octyl-4-isothiazoline-3-one | — | — | — | — |
|  | N-(Fluorodichloromethylthio)phthalimide | — | — | — | — |
| Antifoulant | Pyridine triphenylborane | — | — | — | 5 |
|  | 2,3,5,6-Tetrachloro-4-(methylsulfonyl)pyridine | — | — | — | — |
|  | 2-Pyridinethiol-1-oxide zinc salt | — | 2 | — | — |
|  | 2,4,6-Trichlorophenylmaleimide | — | — | 2 | — |
|  | 3-Iodo-2-propynylbutyl carbamate | — | — | — | — |
|  | Zinc dimethyldithiocarbamate | — | — | — | — |
|  | 2-(Thiocyanomethylthio)benzothiazole | — | — | — | — |
| Pigment | Talc | — | 3 | 1 | — |
|  | Red iron oxide | — | 1 | — | — |
|  | Zinc oxide | — | — | 2 | — |
| Antisagging | Disparon A630-20X | 6 | 5 | 3 | 3 |
| agent | Bentone SD-2 | — | — | — | — |
| Solvent | Xylene | 14 | 15 | 2 | — |
|  | Butyl acetate | — | 10 | — | 3 |
| Total |  | 100 | 100 | 100 | 100 | butylsilyl methacrylate and 50 parts of methyl methac-

TABLE 6

|  |  | Example | | | |
|---|---|---|---|---|---|
|  |  | 5 | 6 | 7 | 8 |
| Polymer | Polymer solution $S_1$ | — | — | 15 | — |
| solution | Polymer solution $S_2$ | — | 30 | — | — |
|  | Polymer solution $S_3$ | — | — | — | — |
|  | Polymer solution $S_4$ | 40 | — | — | — |
|  | Polymer solution $S_5$ | — | — | — | — |
|  | Polymer solution $S_6$ | 5 | — | — | 30 |
|  | Polymer solution $S_7$ | — | 5 | 20 | — |

TABLE 6-continued

|  |  | Example |  |  |  |
|---|---|---|---|---|---|
|  |  | 5 | 6 | 7 | 8 |
| | Polymer solution T$_8$ | — | — | — | — |
| | Polymer solution T$_9$ | — | — | — | — |
| | Polymer solution T$_{10}$ | — | — | — | — |
| Antifoulant | Cuprous oxide | 25 | 40 | 50 | — |
| | Copper thiocyanate | — | — | — | 15 |
| | Copper/nickel solid-solution alloy | — | — | — | — |
| | 2,4,5,6-Tetrachloroisophthalonitrile | — | — | 1 | — |
| | N,N-Dimethyldichlorophenylurea | — | — | — | — |
| | 4,5-Dichloro-2-n-octyl-4-isothiazoline-3-one | 5 | — | — | — |
| | N-(Fluorodichloromethylthio)phthalimide | 2 | — | — | — |
| Antifoulant | Pyridine triphenylborane | — | — | 3 | — |
| | 2,3,5,6-Tetrachloro-4-(methylsulfonyl)pyridine | — | — | — | — |
| | 2-Pyridinethiol-l-oxide zinc salt | — | 4 | — | 10 |
| | 2,4,6-Trichlorophenylmaleimide | — | — | — | — |
| | 3-Iodo-2-propynylbutyl carbamate | — | — | — | — |
| | Zinc dimethyldithiocarbamate | — | — | — | 7 |
| | 2-(Thiocyanomethylthio)benzothiazole | — | — | — | — |
| Pigment | Talc | — | 2 | — | — |
| | Red iron oxide | — | 2 | — | — |
| | Zinc oxide | — | 2 | — | — |
| Antisagging | Disparon A630-20X | 3 | 3 | 3 | 2 |
| agent | Bentone SD-2 | — | — | — | 1 |
| Solvent | Xylene | 20 | 2 | 8 | 25 |
| | Butyl acetate | — | 10 | — | 10 |
| Total | | 100 | 100 | 100 | 100 |

TABLE 7

|  |  | 9 | 10 | 11 | 12 |
|---|---|---|---|---|---|
| Polymer | Polymer solution S | — | — | — | — |
| solution | Polymer solution S$_2$ | — | 10 | 25 | — |
| | Polymer solution S$_3$ | — | 10 | — | — |
| | Polymer solution S$_4$ | — | — | — | 80 |
| | Polymer solution S$_5$ | — | 30 | — | — |
| | Polymer solution S$_6$ | — | — | — | — |
| | Polymer solution S$_7$ | 70 | — | — | — |
| | Polymer solution T$_8$ | — | — | — | — |
| | Polymer solution T$_9$ | — | — | — | — |
| | Polymer solution T$_{10}$ | — | — | — | — |
| Antifoulant | Cuprous oxide | 20 | 35 | — | — |
| | Copper thiocyanate | — | — | — | — |
| | Copper/nickel solid-solution alloy | — | — | 55 | — |
| | 2,4,5,6-Tetrachloroisophthalonitrile | — | — | — | — |
| | N,N-Dimethyldichlorophenylurea | — | — | — | — |
| | 4,5-Dichloro-2-n-octyl-4-isothiazoline-3-one | — | — | — | — |
| | N-(Fluorodichloromethylthio)phthalimide | — | — | — | — |
| Antifoulant | Pyridine triphenylborane | — | 5 | — | — |
| | 2,3,5,6-Tetrachloro-4-(methylsulfonyl)pyridine | — | — | — | 3 |
| | 2-Pyridinethiol-l-oxide zinc salt | — | — | — | — |
| | 2,4,6-Trichlorophenylmaleimide | — | — | — | — |
| | 3-Iodo-2-propynylbutyl carbamate | 5 | — | — | — |
| | Zinc dimethyldithiocarbamate | — | — | — | — |
| | 2-(Thiocyanomethylthio)benzothiazole | — | — | — | — |
| Pigment | Talc | — | 1 | — | 1 |
| | Red iron oxide | — | — | — | 1 |
| | Zinc oxide | — | — | — | 1 |
| Antisagging | Disparon A630-20X | 3 | 3 | 6 | 3 |
| agent | Bentone SD-2 | — | — | — | — |
| Solvent | Xylene | 2 | 6 | 14 | 7 |
| | Butyl acetate | — | — | — | 4 |
| Total | | 100 | 100 | 100 | 100 |

TABLE 8

|  |  | 13 | 14 | 15 | 16 |
|---|---|---|---|---|---|
| Polymer | Polymer solution S | — | 20 | — | — |
| solution | Polymer solution S$_2$ | — | — | — | 25 |
| | Polymer solution S$_3$ | — | — | — | — |
| | Polymer solution S$_4$ | — | 40 | — | — |
| | Polymer solution S$_5$ | — | — | — | — |
| | Polymer solution S$_6$ | — | — | 50 | — |
| | Polymer solution S$_7$ | 30 | — | — | — |
| | Polymer solution T$_8$ | — | — | — | — |
| | Polymer solution T$_9$ | — | — | — | — |
| | Polymer solution T$_{10}$ | — | — | — | — |
| Antifoulant | Cuprous oxide | — | — | — | — |

TABLE 8-continued

|  |  | 13 | 14 | 15 | 16 |
|---|---|---|---|---|---|
|  | Copper thiocyanate | — | — | — | — |
|  | Copper/nickel solid-solution alloy | — | — | — | — |
|  | 2,4,5,6-Tetrachloroisophthalonitrile | — | — | — | 2 |
|  | N,N-Dimethyldichlorophenylurea | — | — | — | — |
|  | 4,5-Dichloro-2-n-octyl-4-isothiazoline-3-one | — | — | — | 5 |
|  | N-(Fluorodichloromethylthio)phthalimide | — | — | 30 | — |
| Antifoulant | Pyridine triphenylborane | — | — | — | — |
|  | 2,3,5,6-Tetrachloro-4-(methylsulfonyl)pyridine | — | — | — | — |
|  | 2-Pyridinethiol-l-oxide zinc salt | — | 20 | — | 10 |
|  | 2,4,6-Trichlorophenylmaleimide | — | 20 | — | — |
|  | 3-Iodo-2-propynylbutyl carbamate | — | — | — | — |
|  | Zinc dimethyldithiocarbamate | — | — | — | — |
|  | 2-(Thiocyanomethylthio)benzothiazole | 40 | — | — | 2 |
| Pigment | Talc | 2 | — | — | — |
|  | Red iron oxide | 3 | — | — | — |
|  | Zinc oxide | — | — | — | — |
| Antisagging agent | Disparon A630-20X | 3 | 3 | 3 | 3 |
|  | Bentone SD-2 | — | — | — | — |
| Solvent | Xylene | 22 | 17 | 17 | 33 |
|  | Butyl acetate | — | — | — | 20 |
| Total |  | 100 | 100 | 100 | 100 |

TABLE 9

|  |  | Example | | | |
|---|---|---|---|---|---|
|  |  | 17 | 18 | 19 | 20 |
| Polymer solution | Polymer solution $S_1$ | — | — | 30 | — |
|  | Polymer solution $S_2$ | — | — | — | 10 |
|  | Polymer solution $S_3$ | — | — | — | — |
|  | Polymer solution $S_4$ | 45 | — | — | — |
|  | Polymer solution $S_5$ | — | — | — | — |
|  | Polymer solution $S_6$ | — | — | — | 45 |
|  | Polymer solution $S_7$ | — | 60 | — | — |
|  | Polymer solution $T_8$ | — | — | — | — |
|  | Polymer solution $T_9$ | — | — | — | — |
|  | Polymer solution $T_{10}$ | — | — | — | — |
| Antifoulant | Cuprous oxide | 35 | — | — | — |
|  | Copper thiocyanate | — | — | — | — |
|  | Copper/nickel solid-solution alloy | — | — | — | — |
|  | 2,4,5,6-Tetrachloroisophthalonitrile | — | — | — | — |
|  | N,N-Dimethyldichlorophenylurea | 5 | — | — | 10 |
|  | 4,5-Dichloro-2-n-octyl-4-isothiazoline-3-one | 10 | — | — | 3 |
|  | N-(Fluorodichloromethylthio)phthalimide | — | — | — | — |
| Antifoulant | Pyridine triphenylborane | — | — | — | — |
|  | 2,3,5,6-Tetrachloro-4-(methylsulfonyl)pyridine | — | — | — | — |
|  | 2-Pyridinethiol-l-oxide zinc salt | — | — | 20 | — |
|  | 2,4,6-Trichlorophenylmaleimide | — | — | — | — |
|  | 3-Iodo-2-propynylbutyl carbamate | — | 20 | — | — |
|  | Zinc dimethyldithiocarbamate | — | — | — | — |
|  | 2-(Thiocyanomethylthio)benzothiazole | — | — | — | — |
| Pigment | Talc | — | — | 3 | — |
|  | Red iron oxide | — | — | 1 | 3 |
|  | Zinc oxide | — | — | 4 | — |
| Antisagging agent | Disparon A630-20X | 3 | — | 3 | 3 |
|  | Bentone SD-2 | — | — | — | — |
| Solvent | Xylene | 2 | 20 | — | 26 |
|  | Butyl acetate | — | — | 39 | — |
| Total |  | 100 | 100 | 100 | 100 |

COMPARATIVE EXAMPLES 1 TO 3

Polymer solutions $T_8$ to $T_{10}$ each was mixed with other ingredients according to each of the formulations shown in Table 10 given below (the figures in the table are given in terms of percent by weight), and each mixture was homogenized with a homomixer at 2,000 rpm. Thus, three coating compositions were prepared. In the table, "Disparon A630-20X" and "Benton SD-2" are the same as in Tables 5 to 9.

TABLE 10

|  |  | Comparative Example | | |
|---|---|---|---|---|
|  |  | 1 | 2 | 3 |
| Polymer solution | Polymer solution $S_1$ | — | — | — |
|  | Polymer solution $S_2$ | — | — | — |
|  | Polymer solution $S_3$ | — | — | — |
|  | Polymer solution $S_4$ | — | — | — |
|  | Polymer solution $S_5$ | — | — | — |
|  | Polymer solution $S_6$ | — | — | — |
|  | Polymer solution $S_7$ | — | — | — |

TABLE 10-continued

|  |  | Comparative Example | | |
|---|---|---|---|---|
|  |  | 1 | 2 | 3 |
| Antifoulant | Polymer solution T$_8$ | 35 | — | — |
|  | Polymer solution T$_9$ | — | 35 | — |
|  | Polymer solution T$_{10}$ | — | — | 35 |
|  | Cuprous oxide | 40 | 40 | 40 |
|  | Copper thiocyanate | — | — | — |
|  | Copper/nickel solid-solution alloy | — | — | — |
|  | 2,4,5,6-Tetrachloroisophthalonitrile | — | — | — |
|  | N,N-Dimethyldichlorophenylurea | — | — | — |
|  | 4,5-Dichloro-2-n-octyl-4-isothiazoline-3-one | — | — | — |
|  | N-(Fluorodichloromethylthio)phthalimide | — | — | — |
| Antifoulant | Pyridine triphenylborane | — | — | — |
|  | 2,3,5,6-Tetrachloro-4-(methylsulfonyl)pyridine | — | — | — |
|  | 2-Pyridinethiol-l-oxide zinc salt | 4 | 4 | 4 |
|  | 2,4,6-Trichlorophenylmaleimide | — | — | — |
|  | 3-Iodo-2-propynylbutyl carbamate | — | — | — |
|  | Zinc dimethyldithiocarbamate | — | — | — |
|  | 2-(Thiocyanomethylthio)benzothiazole | — | — | — |
| Pigment | Talc | 2 | 2 | 2 |
|  | Red iron oxide | 2 | 2 | 2 |
|  | Zinc oxide | 2 | 2 | 2 |
| Antisagging agent | Disparon A630-20X | 3 | 3 | 3 |
|  | Bentone SD-2 |  |  |  |
| Solvent | Xylene | 2 | 2 | 2 |
|  | Butyl acetate | 10 | 10 | 10 |
| Total |  | 100 | 100 | 100 |

Each of the coating compositions prepared in Examples 1 to 20 and Comparative Examples 1 to 3 given above was subjected to a film wear test, antifouling performance test, adhesion test, and cracking resistance test according to the methods described below. The results obtained are summarized in Tables 11 to 14 below.

Erosion Test

The coating compositions prepared were stored in an oven at 50° C. oven for 2 weeks. Steel panels (100×100×1 mm) whose back-side surfaces had been coated with an anticorrosive paint were then coated, on the front side, with each coating composition by spraying to provide a thickness of 200 μm on a dry basis. The coating composition applied was dried indoors at 20° C. for i week to prepare test pieces.

Each test piece was fixed to the outer circumferential surface of a cylindrical drum having a diameter of 50 cm. The resulting drum was immersed in the seawater of Yura Bay, Sumoto, Hyogo, Japan at a depth of 1 m from the sea level and rotated with a motor at such a rate that the peripheral speed of the drum was 16 knots. The reduction in coating film thickness as erosion rate was measured at an interval of 3 months over a period of 18 months. The average erosion rate (μm/month) was calculated. An average erosion rate of 3 μm/month or higher correlates with sufficient antifouling performance and self-polishing property.

Exposure Test (Antifouling Performance Test)

Sandblasted steel panels (100×200×1 mm) were coated with a tar-vinyl anticorrosive paint, and were then coated on both sides with each coating composition by spraying twice to provide a thickness of 240 μm on a dry basis for each side. The coated panels were dried for 1 week in a thermo-hygrostatic chamber at 20° C. and a humidity of 75% to prepare test pieces.

The test pieces were immersed in the seawater of Aioi Bay, Aioi, Hyogo for 18 months to examine the change with time of the proportion of that area of the coating film which was covered with marine organisms attached thereto.

Adhesion Test

Blasted steel panels were coated twice with a tarepoxy anticorrosive paint by spraying to provide a thickness of 125 μm m on a dry basis for each application, and then further coated with a tar-vinyl sealer coat to provide a thickness of 70 μm on a dry basis. The resulting steel panels were coated with each coating composition by spraying twice to provide a thickness of 100 μm on a dry basis and then dried for 1 week in a thermohygrostatic chamber at 20° C. and a humidity of 75% to prepare test pieces.

The test pieces were immersed in artificial seawater. After immersion for each of 3, 6, 9, 12, and 18 months, the test pieces were pulled out of the water and subjected to a crosscut tape test in which the coating film was incised at an interval of 2 mm. Adhesion was evaluated as follows: the test pieces in which the number of unpeeled squares was 25 per 25 are indicated by ○ (acceptance), and those in which that number was 24 or smaller per 25 are indicated by × (rejection).

Cracking Resistance Test

When the test pieces were pulled out of the artificial seawater in the adhesion test, each coating film was visually examined for cracks. Test pieces having no cracks are indicated by ○ (acceptance), while ones having cracks are indicated by × (rejection).

TABLE 11

|  | Erosion Test | | | | | |
|---|---|---|---|---|---|---|
|  | Film thickness reduction (μm) | | | | | Average erosion rate (μm/month) |
|  | 3 months | 6 months | 9 months | 12 months | 18 months | |
| Example 1 | 18 | 36 | 54 | 75 | 113 | 6.3 |
| Example 2 | 15 | 29 | 44 | 62 | 93 | 5.2 |

TABLE 11-continued

|  | Erosion Test | | | | | Average erosion rate (μm/month) |
|---|---|---|---|---|---|---|
|  | Film thickness reduction (μm) | | | | | |
|  | 3 months | 6 months | 9 months | 12 months | 18 months | |
| Example 3 | 20 | 42 | 63 | 84 | 128 | 7.1 |
| Example 4 | 12 | 25 | 37 | 50 | 75 | 4.2 |
| Example 5 | 25 | 50 | 75 | 101 | 152 | 8.4 |
| Example 6 | 27 | 55 | 84 | 116 | 170 | 9.4 |
| Example 7 | 35 | 71 | 105 | 140 | 205 | 11.4 |
| Example 8 | 20 | 42 | 65 | 88 | 132 | 7.3 |
| Example 9 | 16 | 32 | 48 | 66 | 97 | 5.4 |
| Example 10 | 24 | 48 | 72 | 96 | 146 | 8.1 |
| Example 11 | 22 | 47 | 70 | 93 | 141 | 7.8 |
| Example 12 | 25 | 51 | 77 | 105 | 153 | 8.5 |
| Example 13 | 26 | 55 | 85 | 118 | 171 | 9.5 |
| Example 14 | 30 | 62 | 94 | 124 | 185 | 10.2 |
| Example 15 | 15 | 30 | 46 | 60 | 91 | 5.1 |
| Example 16 | 19 | 42 | 60 | 82 | 125 | 6.9 |
| Example 17 | 12 | 24 | 36 | 49 | 75 | 4.2 |
| Example 18 | 23 | 49 | 75 | 101 | 151 | 8.4 |
| Example 19 | 24 | 52 | 76 | 102 | 149 | 8.3 |
| Example 20 | 33 | 66 | 100 | 130 | 198 | 11.0 |
| Comparative Example 1 | 8 | 15 | 15 | 15 | 15 | 0.8 |
| Comparative Example 2 | 10 | 11 | 12 | 12 | 12 | 0.7 |
| Comparative Example 3 | 0 | 0 | 0 | 0 | 0 | 0 |

TABLE 12

|  | Exposure Test (Antifouling Performance Test) Proportion of area covered with marine organisms (%) | | | | |
|---|---|---|---|---|---|
|  | 3 months | 6 months | 9 months | 12 months | 18 months |
| Example 1 | 0 | 0 | 0 | 0 | 0 |
| Example 2 | 0 | 0 | 0 | 0 | 0 |
| Example 3 | 0 | 0 | 0 | 0 | 0 |
| Example 4 | 0 | 0 | 0 | 0 | 0 |
| Example 5 | 0 | 0 | 0 | 0 | 0 |
| Example 6 | 0 | 0 | 0 | 0 | 0 |
| Example 7 | 0- | 0 | 0 | 0 | 0 |
| Example 8 | 0 | 0 | 0 | 0 | 0 |
| Example 9 | 0 | 0 | 0 | 0 | 0 |
| Example 10 | 0 | 0 | 0 | 0 | 0 |
| Example 11 | 0 | 0 | 0 | 0 | 0 |
| Example 12 | 0 | 0 | 0 | 0 | 0 |
| Example 13 | 0 | 0 | 0 | 0 | 0 |
| Example 14 | 0 | 0 | 0 | 0 | 0 |
| Example 15 | 0 | 0 | 0 | 0 | 0 |
| Example 16 | 0 | 0 | 0 | 0 | 0 |
| Example 17 | 0 | 0 | 0 | 0 | 0 |
| Example 18 | 0 | 0 | 0 | 0 | 0 |
| Example 19 | 0 | 0 | 0 | 0 | 0 |
| Example 20 | 0 | 0 | 0 | 0 | 0 |
| Comparative Example 1 | 0 | 10 | 30 | 50 | 90 |
| Comparative Example 2 | 0 | 15 | 40 | 60 | 80 |
| Comparative Example 3 | 40 | 70 | 90 | 100 | 100 |

TABLE 13

|  | Adhesion Test | | | | |
|---|---|---|---|---|---|
|  | 3 months | 6 months | 9 months | 12 months | 18 months |
| Example 1 | ○ | ○ | ○ | ○ | ○ |
| Example 2 | ○ | ○ | ○ | ○ | ○ |
| Example 3 | ○ | ○ | ○ | ○ | ○ |
| Example 4 | ○ | ○ | ○ | ○ | ○ |
| Example 5 | ○ | ○ | ○ | ○ | ○ |
| Example 6 | ○ | ○ | ○ | ○ | ○ |
| Example 7 | ○ | ○ | ○ | ○ | ○ |
| Example 8 | ○ | ○ | ○ | ○ | ○ |
| Example 9 | ○ | ○ | ○ | ○ | ○ |
| Example 10 | ○ | ○ | ○ | ○ | ○ |
| Example 11 | ○ | ○ | ○ | ○ | ○ |
| Example 12 | ○ | ○ | ○ | ○ | ○ |
| Example 13 | ○ | ○ | ○ | ○ | ○ |
| Example 14 | ○ | ○ | ○ | ○ | ○ |
| Example 15 | ○ | ○ | ○ | ○ | ○ |
| Example 16 | ○ | ○ | ○ | ○ | ○ |
| Example 17 | ○ | ○ | ○ | ○ | ○ |
| Example 18 | ○ | ○ | ○ | ○ | ○ |

TABLE 13-continued

| | Adhesion Test | | | | |
|---|---|---|---|---|---|
| | 3 months | 6 months | 9 months | 12 months | 18 months |
| Example 19 | ○ | ○ | ○ | ○ | ○ |
| Example 20 | ○ | ○ | ○ | ○ | ○ |
| Comparative Example 1 | x | x | x | x | x |
| Comparative Example 2 | x | x | x | x | x |
| Comparative Example 3 | x | x | x | x | x |

TABLE 14

| | Cracking Resistance Test | | | | |
|---|---|---|---|---|---|
| | 3 months | 6 months | 9 months | 12 months | 18 months |
| Example 1 | ○ | ○ | ○ | ○ | ○ |
| Example 2 | ○ | ○ | ○ | ○ | ○ |
| Example 3 | ○ | ○ | ○ | ○ | ○ |
| Example 4 | ○ | ○ | ○ | ○ | ○ |
| Example 5 | ○ | ○ | ○ | ○ | ○ |
| Example 6 | ○ | ○ | ○ | ○ | ○ |
| Example 7 | ○ | ○ | ○ | ○ | ○ |
| Example 8 | ○ | ○ | ○ | ○ | ○ |
| Example 9 | ○ | ○ | ○ | ○ | ○ |
| Example 10 | ○ | ○ | ○ | ○ | ○ |
| Example 11 | ○ | ○ | ○ | ○ | ○ |
| Example 12 | ○ | ○ | ○ | ○ | ○ |
| Example 13 | ○ | ○ | ○ | ○ | ○ |
| Example 14 | ○ | ○ | ○ | ○ | ○ |
| Example 15 | ○ | ○ | ○ | ○ | ○ |
| Example 16 | ○ | ○ | ○ | ○ | ○ |
| Example 17 | ○ | ○ | ○ | ○ | ○ |
| Example 18 | ○ | ○ | ○ | ○ | ○ |
| Example 19 | ○ | ○ | ○ | ○ | ○ |
| Example 20 | ○ | ○ | ○ | ○ | ○ |
| Comparative Example 1 | x | x | x | x | x |
| Comparative Example 2 | x | x | x | x | x |
| Comparative Example 3 | x | x | x | x | x |

The results in Tables 11 to 14 clearly show that the coating compositions of Comparative Examples 1 to 3 which employed polymer solutions T$_8$ to T$_{10}$ were unsatisfactory in both of coating film dissolution rate and antifouling performance and were also defective in adhesion and cracking resistance, whereas the coating compositions of Examples 1 to 20 which employed polymer solutions S$_1$ to S$_7$ gave satisfactory results in all the tests. These test results prove that the coating compositions of the present invention have excellent performances.

While the invention has been described in detail and with reference to specific embodiments thereof, it will be apparent to one skilled in the art that various changes and modifications can be made therein without departing from the spirit and scope thereof.

What is claimed is:

1. A coating composition containing as essential components one or more antifoulants and copolymer obtained from a monomer mixture comprising at least one of monomer A represented by formula (1):

$$\begin{array}{c} R^1 \\ | \\ X-Si-R^2 \\ | \\ R^3 \end{array} \quad (1)$$

wherein R$^1$ to R$^3$ each is selected from the group consisting of alkyl groups and aryl groups and are the same or different, and X is an acryloyloxy group, a methacryloyloxy group, a maleinoyloxy group, or a fumaroyloxy group and at least one of monomer B represented by formula (2):

$$Y-(CH_2CH_2O)_n-R^4 \quad (2)$$

wherein R$^4$ is an alkyl group or an aryl group, Y is an acryloyloxy group, a methacryloyloxy group, a maleinoyloxy group, or a fumaroyloxy group, and n is an integer of 1 to 25.

2. A coating composition as claimed in claim 1, wherein said monomer mixture comprises at least one of monomer A, at least one of monomer B, and other monomer(s) copolymerizable therewith in amounts of from 1 to 95% by weight, from 1 to 95% by weight, and from 0 to 95% by weight, respectively.

3. A coating composition as claimed in claim 1, wherein R$^1$ to R$^3$ each is a straight chain or branched alkyl group having up to 20 carbon atoms, a cycloalkyl group, a phenyl group, a substituted phenyl group, a naphthyl group or a substituted naphthyl group and R$^4$ is a straight chain or branched alkyl group having up to 12 carbon atoms, a cycloalkyl group, a phenyl group, a substituted phenyl group, a naphthyl group or a substituted naphthyl group.

4. A coating composition as claimed in claim 1, wherein the weight average molecular weight of the copolymer is in the range of 1,000 to 150,000.

5. A coating composition as claimed in claim 1, wherein the amount of the antifoulant is from 0.1 to 80% by weight based on the weight of the solid contents of the coating composition.

* * * * *